United States Patent [19]
Lackey, Jr. et al.

[11] 3,889,631
[45] June 17, 1975

[54] MEANS FOR EFFECTING FLUIDIZATION IN PYROLYTIC CARBON COATING PROCESSES

[75] Inventors: Walter J. Lackey, Jr., Oak Ridge; John D. Sease, Knoxville, both of Tenn.

[73] Assignee: The United States of America as represented by the United States Energy Research and Development Administration, Washington, D.C.

[22] Filed: Mar. 18, 1974

[21] Appl. No.: 452,166

[52] U.S. Cl. ............. 118/48; 23/288 S; 34/57 A; 118/DIG. 5
[51] Int. Cl. ............................. C23c 13/08
[58] Field of Search ............. 118/DIG. 5, 308, 429; 117/DIG. 6; 34/10, 57 R, 57 A; 432/58

[56] References Cited
UNITED STATES PATENTS

| | | | |
|---|---|---|---|
| 2,600,253 | 6/1952 | Lutz | 117/DIG. 6 |
| 3,309,217 | 3/1967 | Nagel | 118/DIG. 5 |
| 3,746,516 | 7/1973 | Michaud | 432/58 X |
| 3,829,983 | 8/1974 | White | 432/58 X |

Primary Examiner—Morris Kaplan
Attorney, Agent, or Firm—Dean E. Carlson; David S. Zachry; Irving Barrack

[57] ABSTRACT

An improved gas distribution means which has utility in fluidized bed coaters for depositing pyrolytic carbon is described which consists of a plurality of gas-permeable regions within a supporting matrix comprising a relatively thick dimension for structural rigidity and relatively thin sections to inhibit clogging due to decomposition products of the fluidizing gas. A second gas distribution means feeds gas into a plenum below said first gas distribution means to insure a uniform pressurized zone of gas which serves as feed to said gas-permeable regions.

1 Claim, 9 Drawing Figures

MEANS FOR EFFECTING FLUIDIZATION IN PYROLYTIC CARBON COATING PROCESSES

BACKGROUND OF THE INVENTION

The present invention relates to an improved means for effecting fluidization in pyrolytic carbon coating processes. The invention described herein was made in the course of, or under, a contract with the U.S. Atomic Energy Commission.

As used herein, the process of forming pyrolytic carbon refers to a high-temperature-gas-phase dissociation of low-molecular-weight saturated or unsaturated hydrocarbons which undergo polymerization and/or dehydrogenation reactions to ultimately form a finely divided form of carbon. When this occurs in a fluidized bed of particles in which the hydrocarbon itself, or combined with an inert diluent gas, serves as fluidizing medium, the particles will receive a pyrolytic carbon coating, the nature and quality of which depend on several process parameters including such factors as the nature of the pyrolysis gas, deposition temperature, deposition rate, and uniformity of fluidization. For specific details, reference is made to an article by R. J. Bard et al., "Pyrolytic Carbons Deposited in Fluidized Beds at 1100°–1400°C. from Various Hydrocarbons," Carbon, 1968, pp. 603–616. Typically, such coating operations have been conducted in apparatus consisting essentially of a graphite or graphite-lined cylinder or pipe from 1 up to about 3 inches in internal diameter with a lower cone-shaped section which serves as an inlet passage for a fluidizing gas containing a decomposable hydrocarbon and an inert gas such as argon or helium. While this can be an effective way of uniformly coating small (gram-size) charges of particles, effectiveness decreases sharply as the amount of charge increases. One must employ larger diameter chambers for larger charges and, when this is done, non-uniform fluidization and non-uniform coating become a severe problem. This is sometimes referred to as the size or scale-up effect. It is essential and is a principal object of this invention to produce as high a degree of uniform fluidization of the levitated particles as possible, since the degree of coating uniformity is a direct function of the degree or uniformity of fluidization. At the same time the equipment should remain as simple and functional as possible.

Prior attempts to overcome the scale-up effect by enhancing fluidization involve substitution of the cone-shaped gas feed inlet with a gas distributor containing a plurality of jets or ports for feeding the fluidizing gas from a gas plenum to the fluidizing chamber. This is exemplified by the gas distributor means described in U.S. Pat. No. 3,636,923. In another approach a porous plate of substantially uniform thickness with no gas ports is provided at the inlet to serve as the fluidizing medium. While both of these prior modes do overcome the scaleup effect to some degree, they incur certain penalties. Thus, as the diameter of the coating chamber increases from, for example, three to nine inches, a larger number of jets or ports are required to provide the required levitational support for the particles in the coating chamber. At the same time, it multiplies the area and possibilities for blockage of the jets or ports due to the buildup of pyrolytic carbon. Another blockage problem can occur because of particle trapping in the jets or ports during quiescent and dynamic phases of the coating process.

Use of a porous plate to accommodate the scale-up effect requires a plate of sufficient structural integrity to support the particle fuel charge in the quiescent state and sufficient to withstand the high pressure drop which is created in order to supply sufficient fluidizing velocity to the particles. However, experience has shown that a porous plate thick enough to meet these requirements has a limited useful life because pyrolytic carbon becomes trapped in the pores to limit the flow of fluidizing gas, reduce uniformity of flow, and ultimately resulting in a decrease in flow to a non-useable rate. While the plate is not heated directly during the coating process, radiation from the zone of fluidization heats the plate to a temperature sufficient to pyrolyze the hydrocarbon within the plate volume.

It is becoming increasingly evident that multi-pyrolytic-carbon-coated spheroidal fuel particles will serve as the fuel charge for many power-producing nuclear reactors. A normal reactor fuel charge may require tonnage quantities of such coated particles so that any pyrolytic carbon coating process large enough to meet these requirements would encounter the aforementioned scale-up effects. It is, accordingly, a major object of this invention to overcome the aforementioned problems associated with the scale-up effect in large-scale pyrolytic carbon coating apparatus.

A further object is to provide a fluidized bed coater for coating nuclear fuel particles having a particle size or diameter in the range 100 to 1,000 microns at temperatures of 1100° to as high as 1700° C.

Another object is to provide a fluidizing means capable of providing uniform fluidization of a levitated kilogram-size charge of spheroidal fuel particles.

Figures 7, 8, 9:
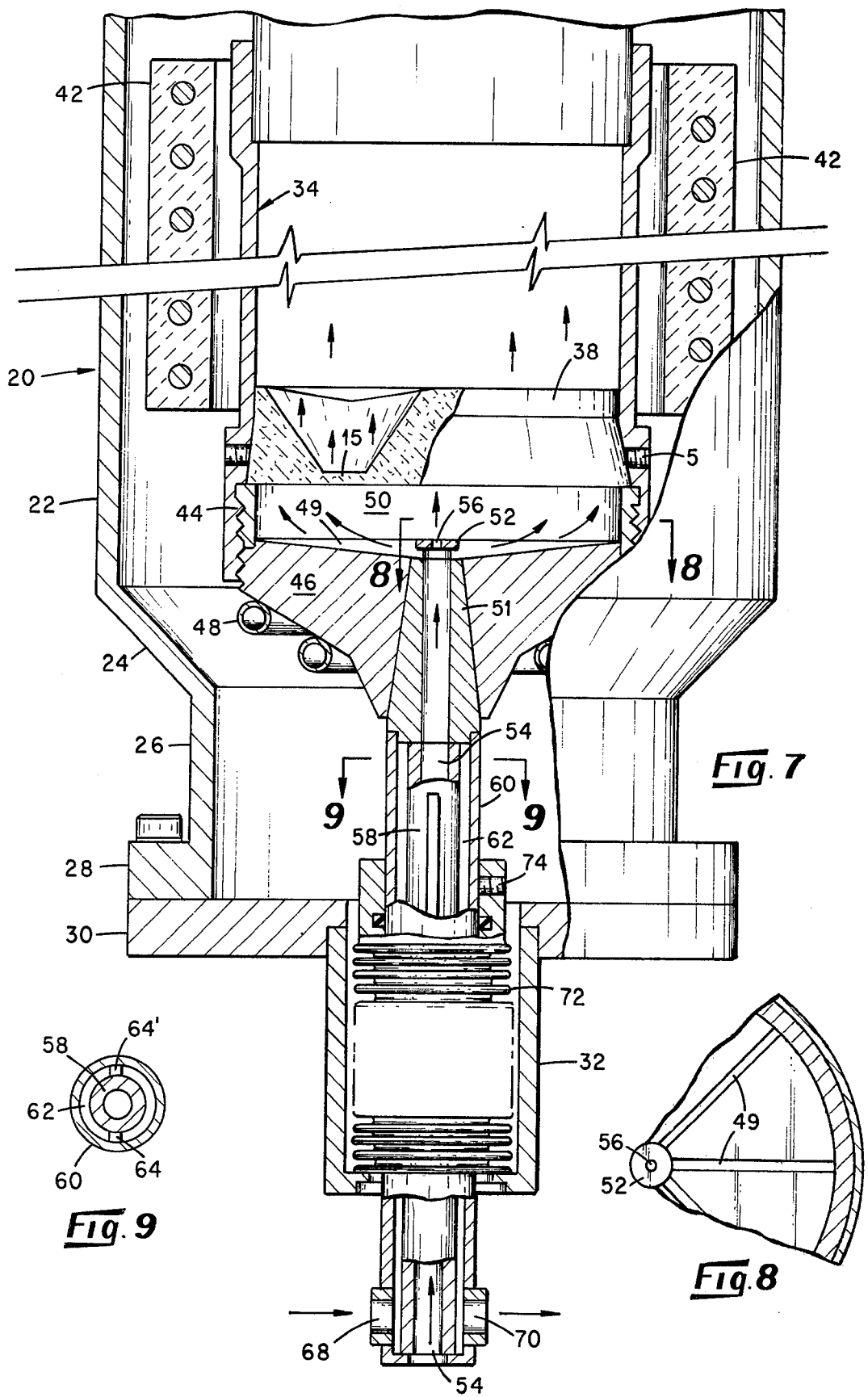
FIG. 7 is a partial sectional view of a pyrolytic coating apparatus incorporating the improved gas distribution means within an arrangement which insures that each thinned gas-permeable area is fed by a substantially uniform front of fluidizing gas.

FIGS. 8 and 9 are views of FIG. 7 taken along lines 8—8 and 9—9 respectively.

SUMMARY OF THE INVENTION

According to our invention, improved gas distribution means are provided which enable uniform fluidization and hence uniform coating to occur over extended periods of time. We have found that effective distribution of a pyrolyzable gas can be effected through thin, porous, permeable discs of a material which is thermally stable under the conditions of pyrolytic carbon coating, said discs being integral with a matrix of sufficient strength to support a given charge of particles contained within pyrolytic carbon coating apparatus. In a preferred embodiment, because of ease of fabrication of porous graphite block is used as the starting material from which the desired support matrix and gas distribution means may be fashioned. Thus, to form the gas distribution means, a porous graphite block is machined to a disc of suitable radius and then drilled to form thinned regions having a thickness from 1/32 to ¼ inch. It is these thinned areas which serve as the gas distribution paths through which uniform fluidization occurs. The undrilled portion of the disc serves as supporting matrix to provide sufficient strength for the particles to be coated. And, while the undrilled supporting matrix is porous, it soon becomes plugged during a coating run as the hydrocarbon gas pyrolyzes to fine carbon within the interstices of the porous matrix. On the other hand, the thinned portions have been found to provide an unobstructed gas flow path throughout the particle coating process without any visual or microscopic evidence of plugging.

Because the gas distributor need not have any orifices even approaching the size of the particle charge, the disc can conveniently serve as the bottom of a crucible which contains the original charge of particles as well as serving as a removable container for the coated particles in the manner to be shown in connection with FIG. 7.

Various modifications of the improved gas distributor are illustrated in FIGS. 1–6.

Figure 1:
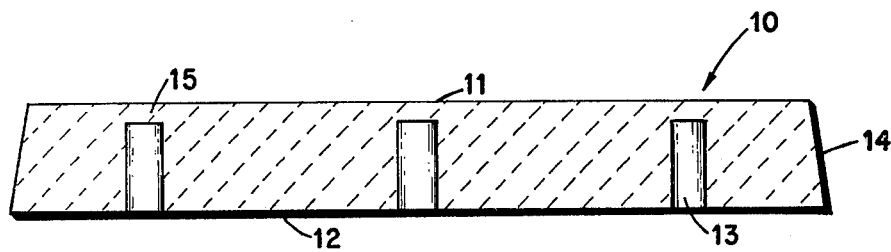
FIGS. 1–6 are cross-sectional views of various variants of improved gas distribution means with thinned gas-permeable areas which permit uniform fluidization to occur.

Referring to FIG. 1, a disk of porous carbon or graphite is provided with a flat top surface 11 and on the gas feed side 12 with a plurality of blind holes 13. Fluidized gas flow is channeled through the holes and diffuses in uninterrupted flow through porous regions 15 into a zone of fluidization shown in FIG. 7. The holes could also be drilled from the top rather than bottom of the disc. The disc may be from ½ to 2 inches thick with 1/16- to 1-inch holes extending to within 1/32 to ¼ inch of the top face of the disc. The size, number, and configuration of the holes 13 are arranged to provide a desired feed gas pattern. The side wall 14 may be beveled from bottom to top to form a snug fit with the lower mating edge of a carbon or graphite tube, thus forming a container in which a fluidized charge of particles are coated with pyrolytic carbon.

Figure 2:
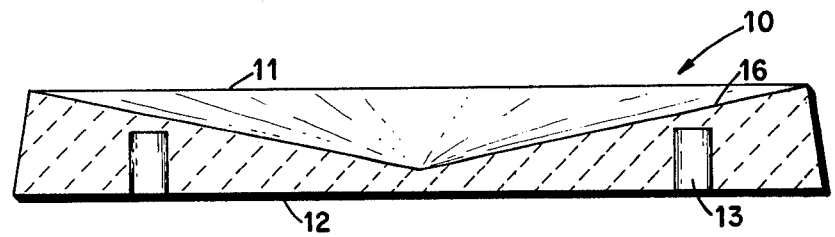

For some coating operations it is desirable to enhance movement of the fluidized particles. As shown in FIG. 2, this can be accomplished by providing a dished conical face 16 to the gas exit side of the disc. As before, a plurality of blind holes 13 extend from the bottom face 12 up to within 1/32 inch of the top surface 11.

Figure 3:
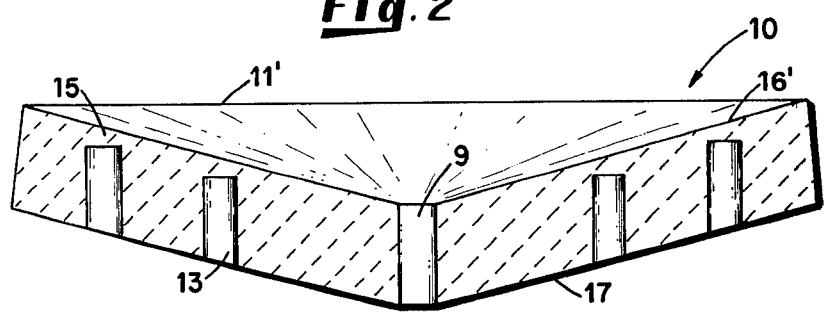

In some applications, it may be desirable to remove the coated particles by a bottom pour arrangement. A central hole 9 is provided in the gas distributor disc 10. As shown in FIG. 3, an upper conical surface 16' serves to slope the quiescent particles to the hole 9 to aid unloading. In addition to an upper conical surface 16', the gas distributor also has a conical lower surface 17 to provide a disc of uniform thickness. As in other embodiments, blind holes 13 are provided which extend up from the bottom face 17 to just short of the upper surface 11'.

Figure 4:
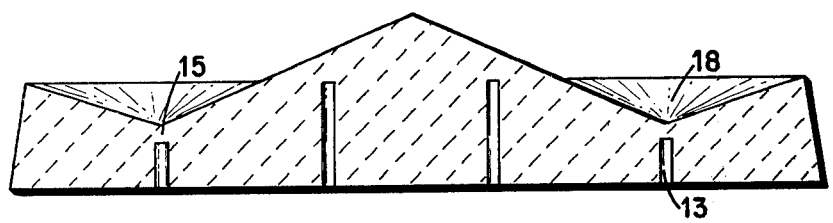

FIG. 4 shows an embodiment utilizing an annular conical depression 18 used as an aid in creating a pattern of particle movement in the fluidized bed in combination with the gas thinned areas just above blind holes 13.

Figure 5:
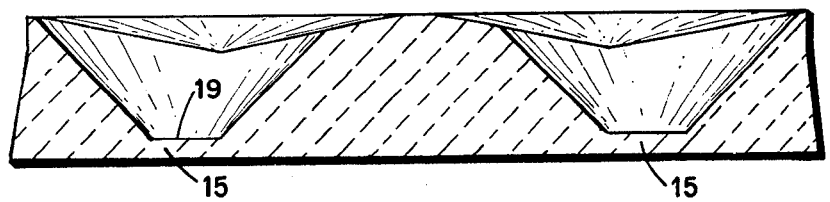

In FIG. 5, a variation is shown in which thinned areas 15 which permit gas permeation are created by machining a complex upper surface including an annular conical depression as in FIG. 4 and a plurality of generally conical depressions terminating in a flat circular area 19 so as to provide thin gas-permeable regions 15 through which the gas flows at a velocity sufficient to minimize pore blockage.

Figure 6:
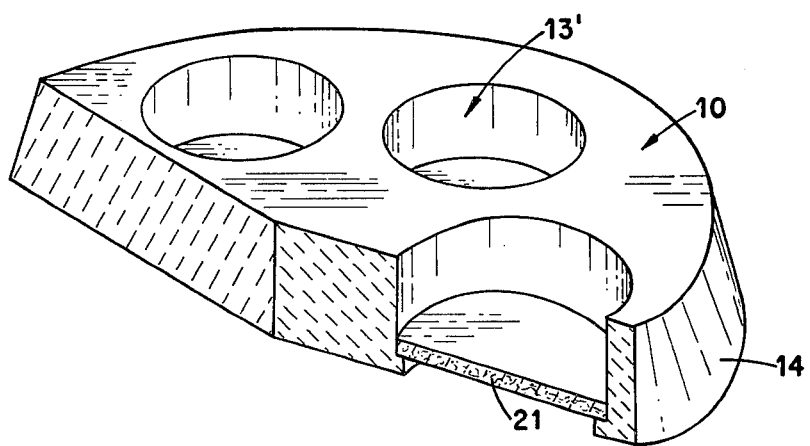

While there are clear advantages in fabricating the supporting and gas-permeation portions from a single porous material as illustrated in FIGS. 1–5, the scope of the invention extends to the use of separate materials having different physical properties than the gas permeation areas. A modification within the scope of the invention is shown in FIG. 6 in which the supported structure is made from a solid material such as alumina, zirconia, or other refractory material. The disc of solid material is drilled from one face to the other to form holes 13' which can then accommodate one or more thin porous gas-permeable discs 21 to serve as regions for virtually unimpeded gas flow with minimum pressure drop.

The improved gas distributor disc will now be described in association with a gas feed means and pyrolytic carbon coating means. Referring to FIG. 7, there is shown a furnace wall 20 comprising an upper section 22, an intermediate tapered section 24, and a lower section 26 which terminates in an outwardly extending flange 28. A centrally apertured bottom plate 30 is joined to the flange through bolts suitably positioned along the periphery of the flange. The bottom plate aperture is enclosed by a bellows housing 32 having a central aperture aligned with the aperture in the bottom plate 30 to allow passage for a gas feed system and gas cooling means for feeding a pyrolyzable hydrocarbon gas to a gas-solid contactor.

A gas-solid contactor 34 consisting of a carbon or graphite cylinder is positioned within upper section 22 of the furnace wall opposite a furnace heater 42. The bottom end of contactor 34 is internally threaded and adapted to engage, in sequence, a gas distributor disc 38 of improved design as shown in FIGS. 1–6, a spacer ring 44 to provide bottom support for disc 38, and a centrally apertured cone-shaped block 46 in thermal contact with a cooling coil 48. The gas distribution disc 38 fits snugly into a beveled section conforming to the outer diameter of the disc 38 and is secured laterally in place by set screws 5 extending through circumferential holes along cylinder 34. The cylinder 34 is thus adapted to contain a charge of particles which can be fluidized with a suitable feed gas entering through gas-permeable areas 15 of disc 38 while the heater 42 provides sufficient heat to pyrolyze the hydrocarbon component of the fluidizing gas and coat the particles.

The distance separating cooling block 46 and gas distribution disc 38 defines a plenum 50 which receives a cooled fluidizing gas from a gas nozzle 51 positioned within the central aperture of block 46. In order to ensure uniform gas flow in the plenum 50 and hence uniform fluidizing flow through regions 15 of gas distributor disc 38, the top surface of block 46 is machined to provide a number of radial channels 49 radiating from nozzle 51. The channels 49, as shown in FIGS. 7 and 8, are of diminishing depth as they extend radially from the nozzle feed. Just above the nozzle 51, the top surface of block 46 is countersunk to allow for a baffle 52 having a central opening 56. Thus, a portion of the gas fed from nozzle 51 passes through opening 56 and the remainder is diverted through radial channels 49 to ensure a uniform distribution of gas in plenum 50 and hence into contactor 34 through gas-permeable area 15 of disc 38. Nozzle 51 receives gas through a double-walled pipe which is joined to the nozzle and extends through the central aperture in bellows housing 32. The double-walled pipe arrangement consists of a central pipe 58 surrounded by and separated from a second pipe 60 thereby defining an annulus 62 through which cooling water flows to cool the gas flowing through the central pipe from an external source. Fluidizing gas passes through the core 54 of pipe 58 to nozzle 51. In FIG. 9, a pair of struts 64 and 64' extend along a part of the pipe length in annulus 62 to maintain alignment between the pipes and allow a continuous coolant passage from an inlet 68 to outlet 70. A bellows 72 resting in bellows housing 32 is attached to the pipe 60 with set screws 74 so that the entire gas feed and distribution means as well as the fluidized bed coater floats to absorb differential expansion between the furnace body and the internals.

In operation, a charge of particles is fed into gas-solid contactor 34. Fluidizing gas is fed into the contactor through the described gas feed and distribution means. In order to prevent premature pyrolysis of the coating gas, coolant is supplied to annulus 62. As the gas passes through nozzle 51 and into plenum 50, additional cooling is provided by block 46 which is cooled by coil, 48. Although block 46 is not heated directly, the radiation from the fluidizing chamber is so great that, without the cooling action provided by the cooling block, the gas in the plenum may be pyrolyzed even before it traverses the then gas-permeable areas of disc 38. When the particles are fluidized and the hydrocarbon component of the fluidizing gas reaches a pyrolyzing temperature, coating occurs. The quality of the coating in terms of uniformity will be a direct function of the uniformity of the fluidization which, in turn, is a function of the flow uniformity obtained through the thinned gas-permeable regions of the disc 38.

The following example is a representative embodiment which illustrates the advantages achievable with the hereindescribed improved gas-distribution means.

EXAMPLE

A 1200 gram charge of thoria ($ThO_2$) microspheres having a diameter in the range 350–420 $\mu$m (average 385 $\mu$m) with a surface area of about 18,700 $cm^2$ was pyrolytically coated in the apparatus shown in FIG. 7 using a porous frit according to the design shown in FIG. 5. This frit was made from a grade 25 carbon, was 5 inches in diameter, and had 48 percent porosity with a minimum thickness of 1/8 inch (regions 15). Two pyrolytic carbon coatings were applied to the fluidized microspheres at a temperature of 1375° C. The first coating was a so-called "buffer" coating applied with a fluidizing gas consisting of 57 percent acetylene and 43 percent helium in which fluidizing gas contacted the fluidized microspheres for about 5 minutes. The fluidizing gas was then changed to 100 percent propylene which contacted the buffer coated particles for a period of 15 minutes to deposit a so-called "low temperature" isotropic coating.

For purposes of comparison, the same procedure was used in the same apparatus except that the porous frit of FIG. 5 was replaced with a 5-inch uniformly flat porous frit 5/8-inch uniform thickness. Significant differences were noted in the character of the coated particles made from the two runs and in the condition of the porous frits. It was noted that variation in coating thickness from one particle to another was much wider in the particles coated using the uniformly flat porous disc in comparison to that achieved with the porous frit of the FIG. 5 design. Macro and micro examination of the uniformly flat frit showed extensive carbon deposition on its top surface (facing the fluidized particles). Flow tests after the buffer coating run showed that the frit was extensively plugged with only a small central portion open enough to allow gas flow. The usefulness of the flat plate for any further runs was seriously impaired while the plate containing thinned porous areas was reuseable to obtain highly uniform coatings.

What is claimed is:

1. A fluidized bed coater comprising:
a coating chamber and heating means therewith;
a porous plate defining the chamber bottom wall and the upper wall of a plenum chamber;
means feeding and distributing a fluidizing gaseous stream into said plenum chamber, said gas then passing through said porous plate to effect fluidization of particulate material supported on said plate;
said porous plate being relatively thick, whereby to adequately support the particulate material in a quiessent state, and having a plurality of uniformly spaced apertures therein;
a relatively thin replaceable porous plate supported in each said aperture; and
said thin plate of a dimension whereby the passageways thereof will not clog due to decomposition products of said gaseous stream.

* * * * *